(12) United States Patent
Miyanaga et al.

(10) Patent No.: US 10,373,543 B2
(45) Date of Patent: Aug. 6, 2019

(54) DISPLAY DEVICE

(71) Applicant: Japan Display Inc., Minato-ku (JP)

(72) Inventors: Naoki Miyanaga, Minato-ku (JP); Koji Yamamoto, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/884,423

(22) Filed: Jan. 31, 2018

(65) Prior Publication Data

US 2018/0233076 A1 Aug. 16, 2018

(30) Foreign Application Priority Data

Feb. 13, 2017 (JP) .................................. 2017-024328

(51) Int. Cl.
*G09G 3/20* (2006.01)
*G09G 3/36* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC ....... *G09G 3/2003* (2013.01); *G02F 1/13439* (2013.01); *G02F 1/133345* (2013.01); *G02F 1/136286* (2013.01); *G09G 3/3648* (2013.01); *G09G 3/3688* (2013.01); *G02F 1/1368* (2013.01); *G02F 2201/123* (2013.01); *G09G 3/3614* (2013.01); *G09G 2300/0426* (2013.01); *G09G 2300/0823* (2013.01); *G09G 2320/0666* (2013.01); *G09G 2354/00* (2013.01)

(58) Field of Classification Search
CPC ..... G09G 2310/027; G09G 2300/0426; G09G 2310/0297; G09G 2300/0408; G09G 2310/0289; G09G 3/3275; G09G 2310/0275; G02F 1/13454; G02F 2001/13456; G02F 1/13458; G02F 2001/133388
USPC .......................................... 345/100; 349/149
See application file for complete search history.

(56) References Cited

U.S. PATENT DOCUMENTS

2006/0244710 A1* 11/2006 Iriguchi ............... G09G 3/3266
 345/100
2012/0146972 A1* 6/2012 Fujikawa ............ G02F 1/13452
 345/206
2016/0291786 A1 10/2016 Yokoi

* cited by examiner

*Primary Examiner* — Koosha Sharifi-Tafreshi
(74) *Attorney, Agent, or Firm* — Oblon, McClelland, Maier & Neustadt, L.L.P.

(57) ABSTRACT

According to one embodiment, an RGB image signal is output from a driver, first ends of a first open-close signal line and a second open-close signal line are each connected to the driver and second ends of the first open-close signal line and the second open-close signal line are free. Power is supplied to a signal selection circuit, which selects a signal line and outputs a polarity inverted image signal, via the first open-close signal line and the second open-close signal line.

16 Claims, 17 Drawing Sheets

DISPLAY DEVICE

CROSS-REFERENCE TO RELATED APPLICATIONS

This application is based upon and claims the benefit of priority from the prior Japanese Patent Application No. 2017-24328, filed on Feb. 13, 2017; the entire contents of which are incorporated herein by reference.

FIELD

Embodiments of the present invention described herein relate to a display device.

BACKGROUND

Array substrates of display panels of display devices include gate lines and signal lines arranged orthogonal to the gate lines. Pixels for each color are disposed at crossing positions between the gate lines and the signal lines. A signal selection circuit distributes image signals output from a driver to the pixels of each color, inverts the polarities of the image signals, and outputs the image signals to the signal lines.

The signal selection circuit has analog switches for each pixel. The analog switches are made from CMOS. Open-close signal lines are connected to the plurality of analog switches. Open-close pulse signals of a positive polarity and open-close pulse signals of a negative polarity are supplied via the open-close signal lines. The open-close pulse signals being supplied to the open-close signal lines result in the emission of noise, which is a problem.

In light of this problem, an object of the present invention is to provide a display device that enables the reduction of noise emitted from the open-close signal lines connected to the analog switches included in the signal selection circuit.

DETAILED DESCRIPTION

Figure 1:
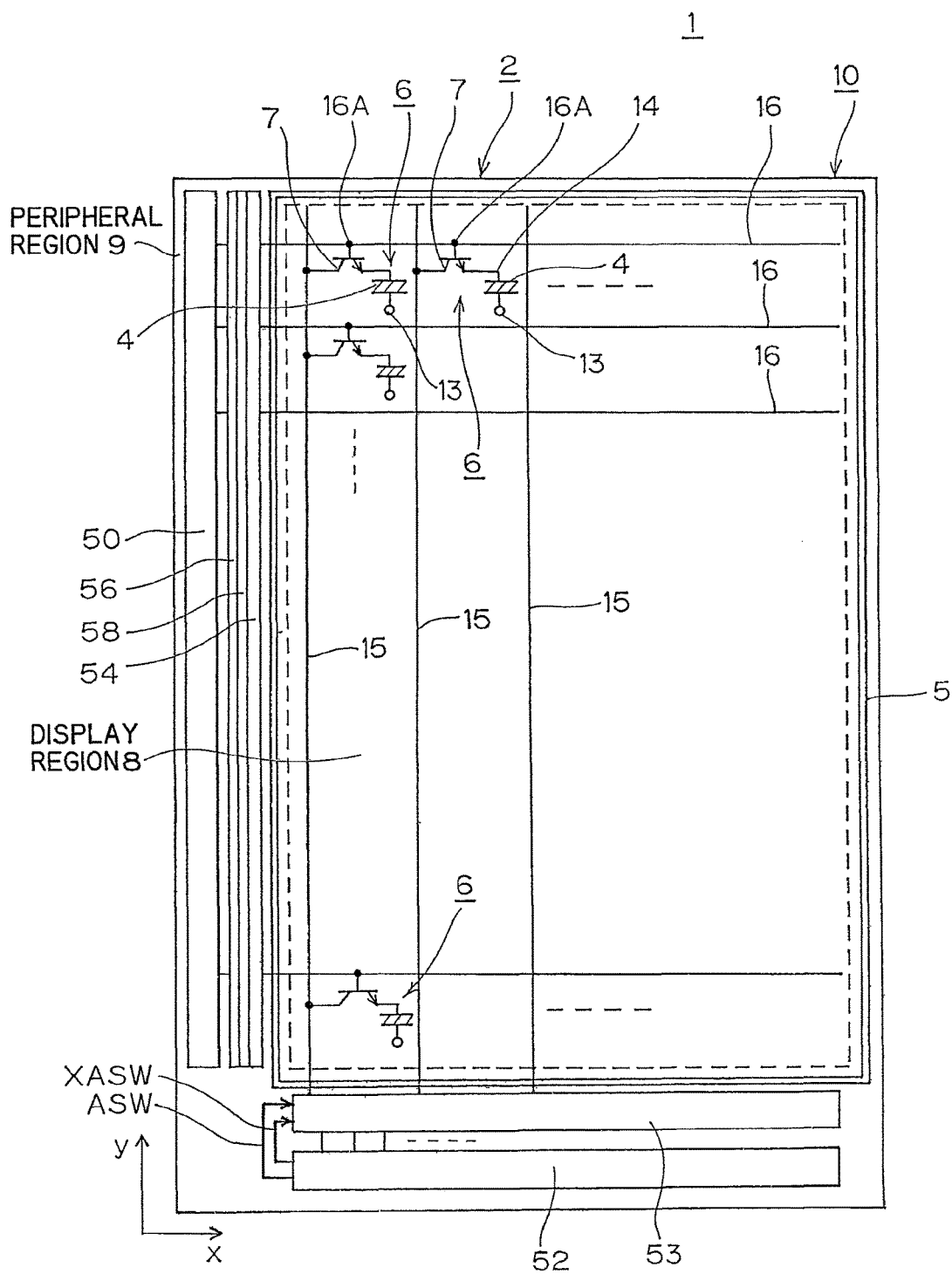
FIG. 1 is a plan view of pixels in a display panel of a display device according to a first embodiment of the present invention.

According to embodiments, a display device includes a first insulating substrate, a plurality of gate lines in a display region on the first insulating substrate, a plurality of signal lines in the display region, the plurality of signal lines being orthogonal to the plurality of gate lines, pixels including switching elements at respective positions where the plurality of gate lines and the plurality of signal lines intersect and pixel electrodes connected to the switching elements, a driver configured to output an image signal, a signal selection circuit configured to distribute the image signal output from the driver to the signal lines connected to the pixels, a first open-close signal line configured to supply a first open-close signal from the driver to the signal selection circuit, and a second open-close signal line configured to supply a second open-close signal from the driver to the signal selection circuit, the second open-close signal having a different polarity than the first open-close signal. In this display device, a first end of the first open-close signal line is connected to the driver and a second end of the first open-close signal line is free, and a first end of the second open-close signal line is connected to the driver and a second end of the second open-close signal line is free.

The display device of this embodiment will be described hereinafter with reference to the accompanying drawings. While certain embodiments shall be described, the embodiments are presented by way of example only and are not intended to limit the scope of the invention. Indeed, the embodiments described herein may be embodied in a variety of other forms, and various omissions, substitution, and changes in the form of the embodiments may be made without departing from the spirit of the invention. The accompanying claims and their equivalents are intended to cover such forms or modifications as would fall within the scope and spirit of the invention. In the drawings, components may be shown schematically regarding the width, thickness, shape and the like, instead of being shown in accordance with the actual sizes, for the sake of clear illustration. The drawings are merely exemplary and do not limit the interpretations of the present invention in any way. In the specification and the drawings, components that are substantially the same as those depicted in a previous drawing (s) bear the identical reference signs thereto, and detailed descriptions thereof may be omitted.

Applications of a liquid crystal display device according to this embodiment include lateral electric field display devices sometimes referred to as an in-plane switching (IPS) mode display devices, and particularly fringe field switching (FFS) mode display devices, which use fringe fields and are derived from IPS.

In addition, the driver and the signal selection circuit according to this embodiment can be applied to organic EL display devices.

First Embodiment

A liquid crystal display device according to a first embodiment will be described hereinafter with reference to FIGS. 1 to 14.

(1) Overall Configuration of Display Panel 1

A display panel 1 of the liquid crystal display device includes an array substrate 2, a counter substrate 3, a liquid crystal layer 4 held in a gap between the array substrate 2 and the counter substrate 3, and a sealing member 5 which causes peripheral regions 9 of the substrates 2 and 3 to adhere to each other to seal the liquid crystal layer 4. The display panel 1 includes a display region 8 for displaying images and the peripheral region 9 surrounding the display region 8. Pixels 6 are arranged in a grid pattern in the displays region 8.

(2) Circuitry Configuration of Display Panel 1

The circuitry configuration of the display panel 1 will be described hereinafter with reference to FIGS. 1 and 2. FIG. 1 illustrates the circuitry configuration of the array substrate 2 for a case when the display panel 1 displays images.A As illustrated in FIG. 1, gate lines 16 in a transverse direction (x-axis direction) and signal lines 15 in a vertical direction (y-axis direction) are arranged in a grid pattern in the display region 8 of a glass substrate 10 of the array substrate 2. The pixels 6 are formed at respective intersections of the gate lines 16 and the signal lines 15. In other words, a region partitioned by two gate lines and two source lines can be defined as a pixel 6. Each pixel 6 includes a switching element, namely an n-type channel or p-type channel thin film transistor (TFT) 7, and a pixel electrode 14. A gate electrode of the TFT 7 is connected to the gate line 16, a source electrode of the TFT 7 is connected to the signal line 15, and a drain electrode of the TFT 7 is connected to the pixel electrode 14. Note that the pixels 6 respectively correspond to red (R), green (G), and blue (B) pixels.

A driver 52 and a signal selection circuit 53 are disposed in the lower peripheral region 9 of the array substrate 2. The driver 52 and the signal selection circuit 53 are described later.

A gate driver 50 is disposed along the vertical direction in the left peripheral region 9 of the glass substrate 10. The gate driver 50 outputs gate signals to the gate lines 16.

(3) Structure of Touch Sensor

The structure of a touch sensor will be described hereinafter with reference to FIG. 2. FIG. 2 illustrates the circuitry configuration of the array substrate 2 and the counter substrate 3 for a case when the display panel 1 functions as a touch panel.

Figure 2:
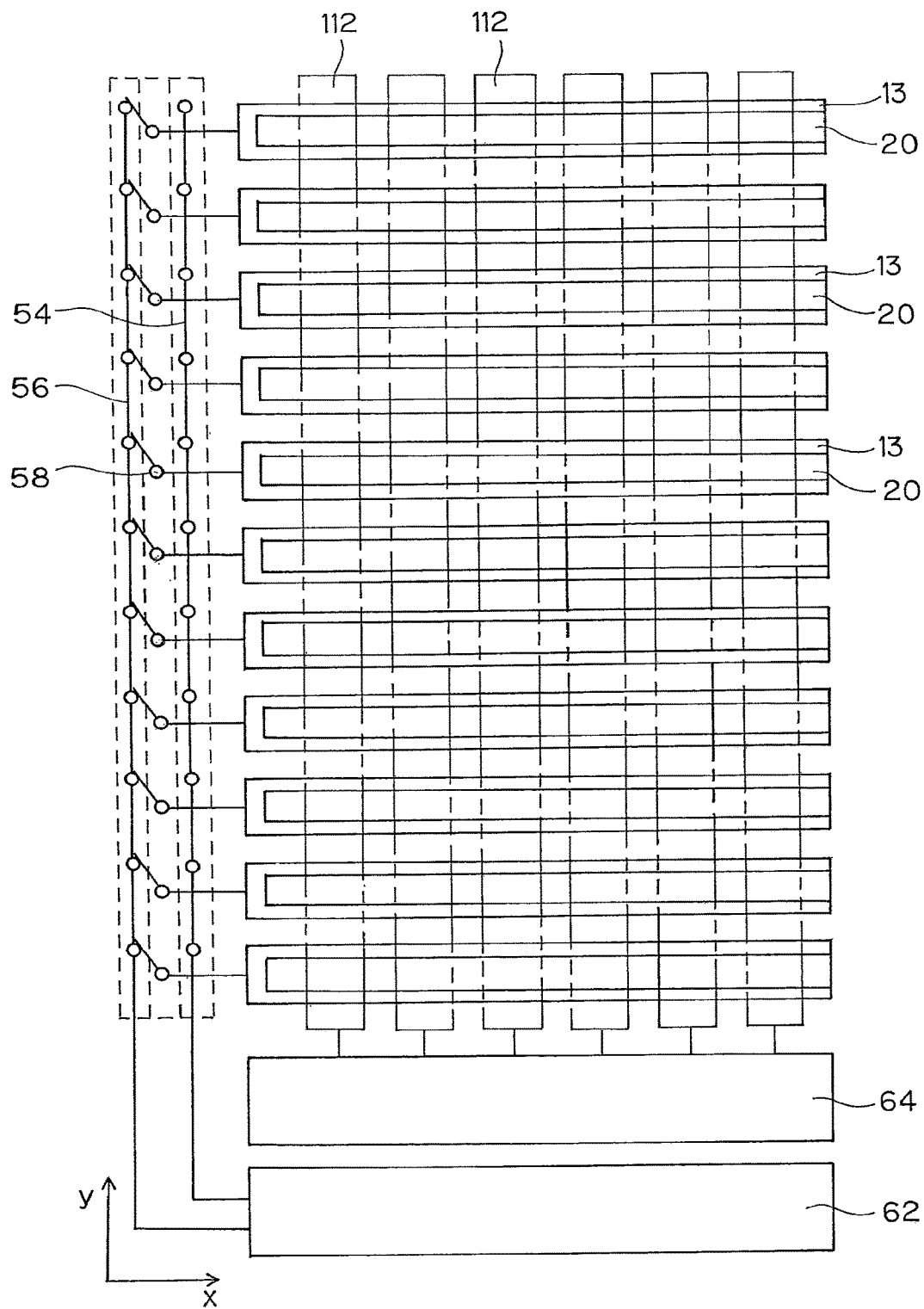
FIG. 2 is a drawing illustrating the relationship between common electrodes and second sensor electrodes.

As illustrated in FIG. 2, common electrodes 13 extend in the transverse direction (the x-axis direction) and are disposed at predetermined intervals in the vertical direction (the y-axis direction) on the array substrate 2. The common electrodes 13 serve both as common electrodes and first sensor electrodes.

Furthermore, as illustrated in FIG. 2, a common power supply line 54 is wired along the vertical direction on the left side of the common electrodes 13 that extend to the peripheral region 9 of the array substrate 2. The common power supply line 54 supplies DC common voltage to the common electrodes 13 when the display panel 1 displays an image. A sensor power supply line 56 is wired along the vertical direction on the left side of the common power supply line 54. The sensor power supply line 56 supplies high-frequency pulses when the display panel 1 is used as a touch sensor.

The gate driver 50 described above is disposed on the left side of the sensor power supply line 56.

Switching switches 58 are arranged between the common power supply line 54 and the sensor power supply line 56. This switching switch 58 is provided for each of the common electrodes 13 that extend in the transverse direction, and these switching switches 58 are used to select whether to supply the common electrodes 13 with the DC common voltage from the common power supply line 54 or the high-frequency pulses from the sensor power supply line 56.

An ENB circuit 60 is disposed between the common power supply line 54 and the display region 8. The ENB circuit 60 controls the ON/OFF timing of the gate signals output from the gate driver 50 to each of the gate lines 16.

As illustrated in FIG. 2, the sensor power supply line 56 is connected to a first sensor controller 62. The first sensor controller 62 is disposed in the lower peripheral region 9 of the array substrate 2. The first sensor controller 62 outputs high-frequency pulsed sensor voltage for the touch sensor to the sensor power supply line 56. The common power supply line 54 and the switching switches 58 are also connected to the first sensor controller 62. The first sensor controller 62 supplies a predetermined DC common voltage to the common power supply line 54, and outputs timing signals to the switching switches 58 for switching between displaying and touch sensing.

As illustrated in FIG. 2, second sensor electrodes (hereinafter referred to simply as "sensor electrodes") 112 extend in the vertical direction (the y-axis direction) and are disposed at predetermined intervals in the transverse direction (the x-axis direction) on the surface of the counter substrate 3. Lower ends of the sensor electrodes 112 are connected to a second sensor controller 64. The second sensor controller 64 is disposed in the lower peripheral region 9 of the array substrate 2.

When the display panel 1 is used as a mutual capacitance type touch sensor, as illustrated in FIG. 2, the switching switches 58 are switched to the position of the sensor power supply line 56 and the high-frequency pulses are supplied from the first sensor controller 62 to the common electrodes 13. When the finger of a user contacts or is brought near to the sensor electrode 112, the capacitance between the sensor electrode 112 and the common electrode 13 changes, and the second sensor controller 64 detects the change and the position where the change in capacitance occurred.

(4) Pixel 6

Figure 3:
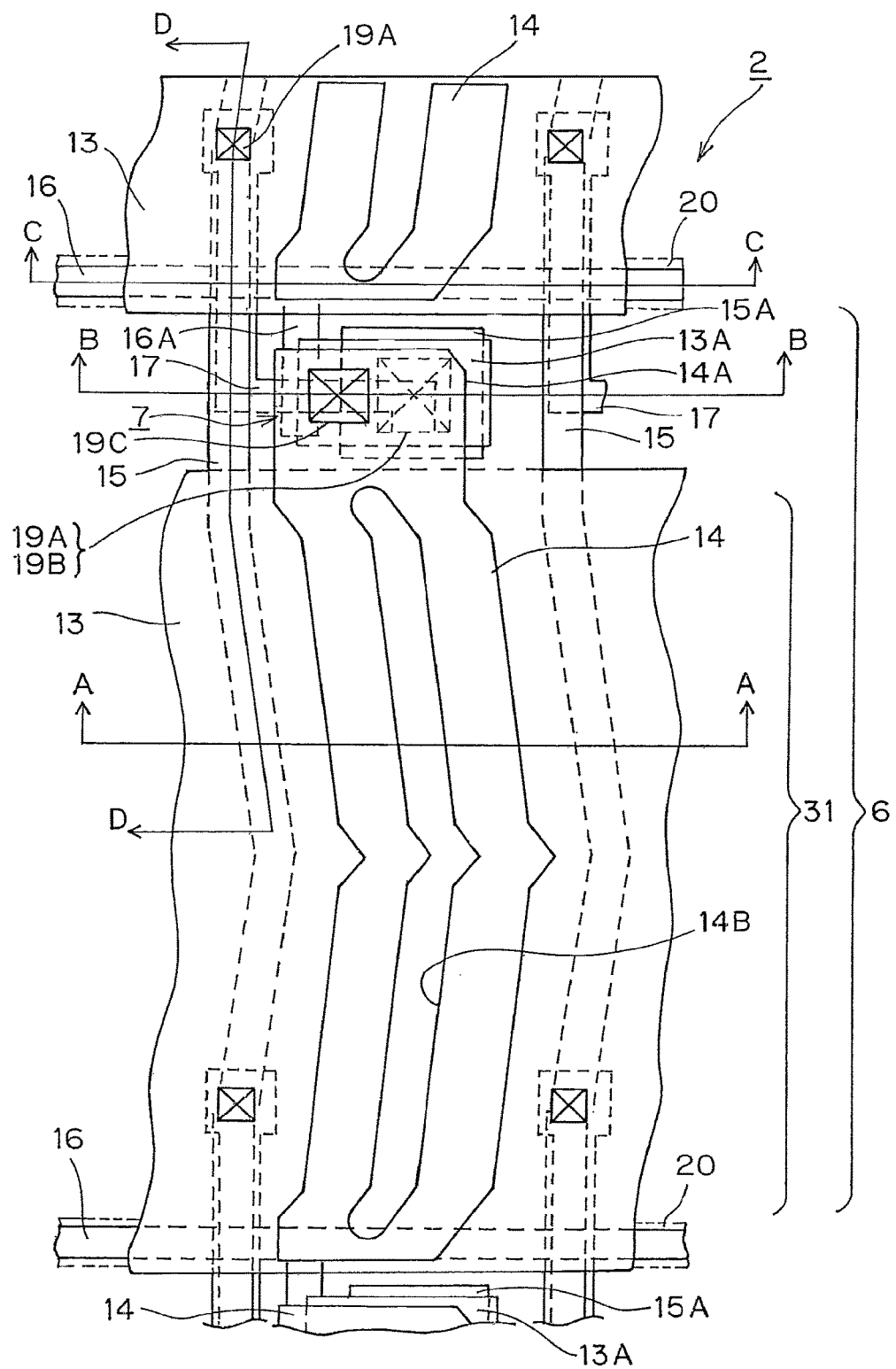
FIG. 3 is an enlarged plan view of a pixel.

The structure of the pixel 6 will be described hereinafter with reference to FIG. 3. As illustrated in FIG. 3, the pixel 6 of each of RGB colors extends along the direction of the signal lines 15. A large portion of the longitudinal direction region of each pixel 6 corresponds to a pixel opening portion 31. The pixel electrode 14, including a slit 14B, is disposed in the pixel opening portion 31. The TFT 7 is formed in one end portion of the pixel 6 and a pixel electrode extension portion 14A extending from the pixel electrode 14 is disposed.

(5) Array Substrate 2

The structure of the array substrate 2 will be described hereinafter with reference to FIGS. 3 to 7.

Figure 5:
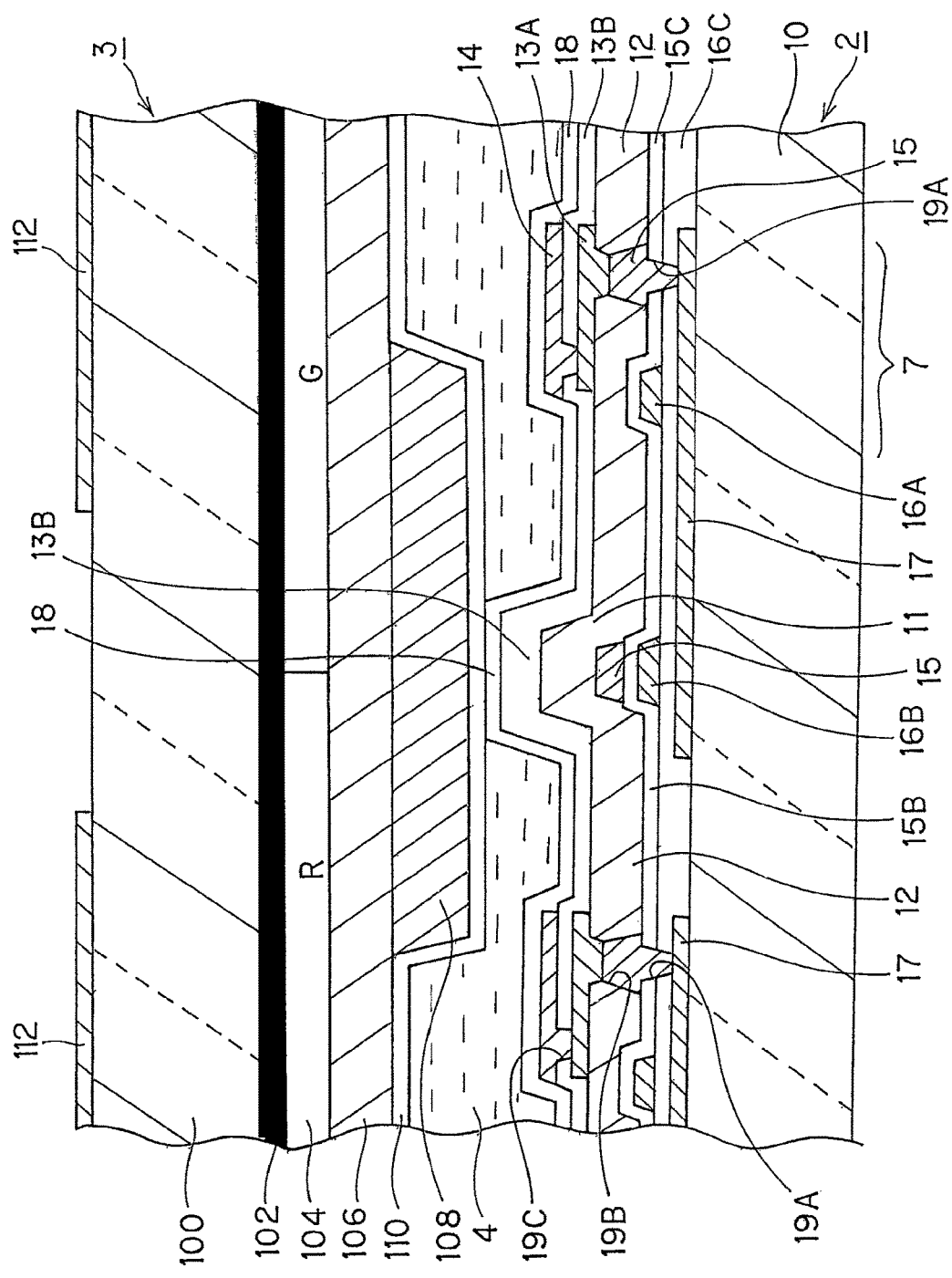
FIG. 5 is a cross-sectional view taken along line B-B of FIG. 3.

A polysilicon interconnect 17 constituting a semiconductor of the TFT 7 is formed on the glass substrate 10 of the array substrate 2 (see FIG. 5).

A gate insulating film 16C is formed on the polysilicon interconnect 17 (see FIG. 5).

Figure 6:
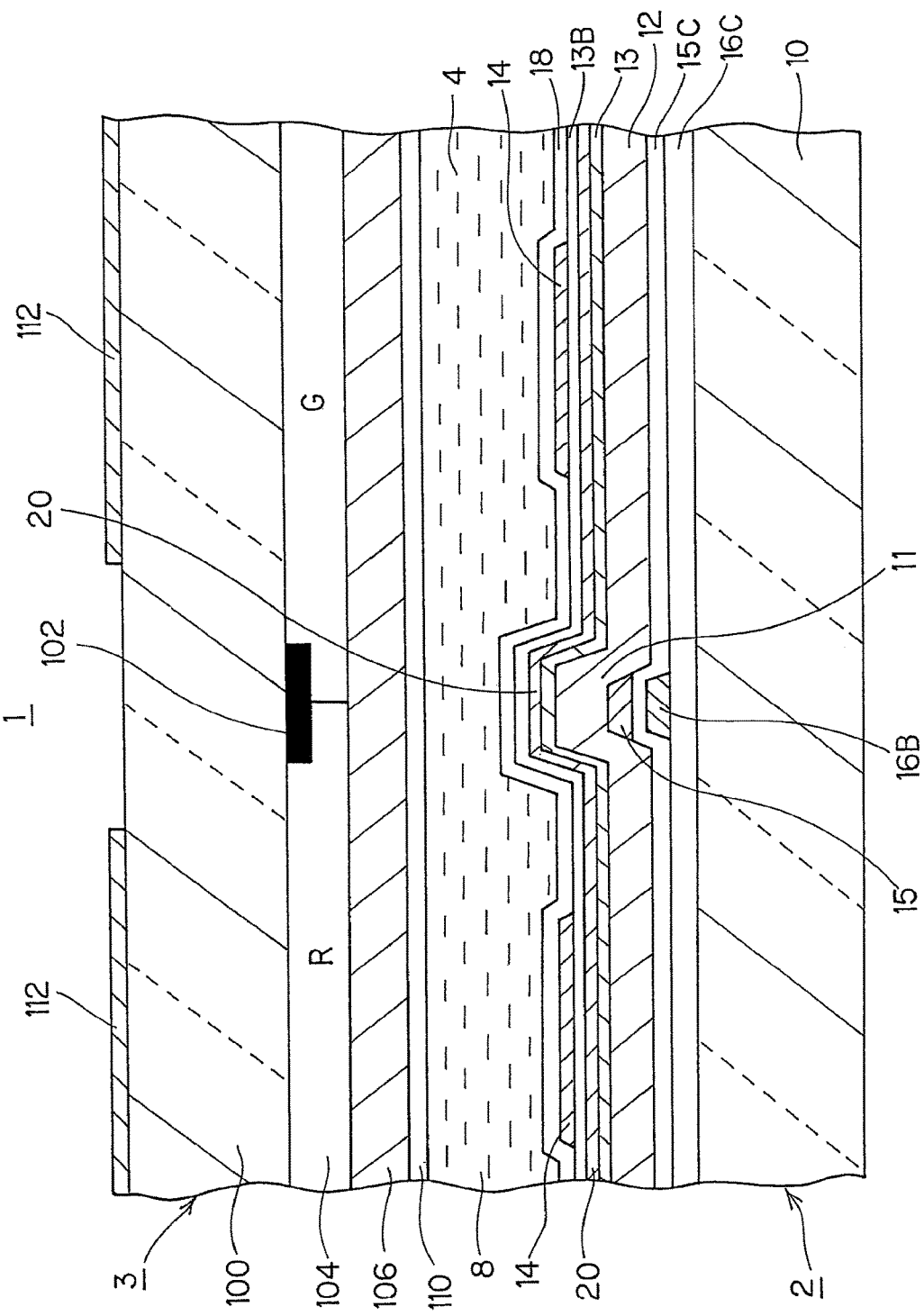
FIG. 6 is a cross-sectional view taken along line C-C of FIG. 3.
Figure 7:
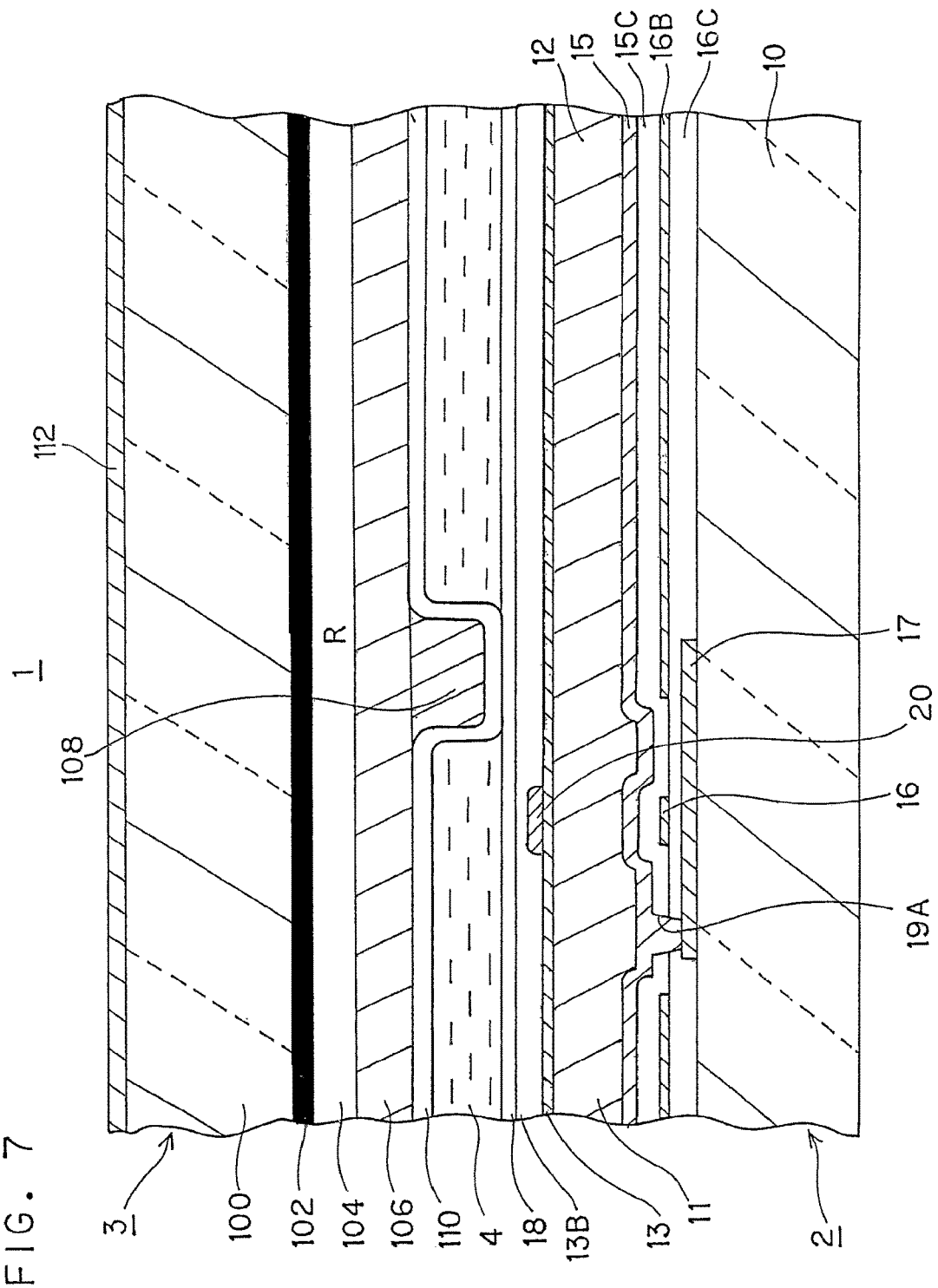
FIG. 7 is a cross-sectional view taken along line D-D of FIG. 3.

The gate lines 16 are formed in parallel in the transverse direction (the x-axis direction) at predetermined intervals on the gate insulating film 16C (see FIGS. 6 and 7). A gate electrode branch line 16A that connects to the TFT 7 extends in the vertical direction at a position of the gate line 16 corresponding to the TFT 7 (see FIG. 5). Additionally, a first metal wiring 16B is formed in the vertical direction (see FIGS. 5 and 6). The first metal wiring 16B is formed in a direction orthogonal to the transverse direction gate line 16, at a position corresponding to the vertical direction signal line 15. The first metal wiring 16B is floated with respect to the other conductive layers and is a metal component formed from the same material and on the same layer as the gate line 16. The first metal wiring 16B is disposed to increase the height of an array protrusion 11.

A first insulating film 15C is formed on the gate line 16, the gate electrode branch line 16A, and the first metal wiring 16B (see FIGS. 3 to 7).

The signal line 15 is formed in the vertical direction (the y-axis direction) on the first insulating film 15C (see FIGS. 5 and 6).

An organic insulating film (flattening film) 12 is formed on the first metal wiring 16B and the signal line 15. The organic insulating film 12 is formed thicker on the signal line 15 and the vicinity thereof than at other portions, thereby forming the array protrusion 11 (see FIGS. 5 and 6). Moreover, the array protrusion 11 is formed continuously along the direction of the signal line 15 so as to sandwich the elongated pixel opening portion 31 from the left and the right.

The common electrodes 13, which are made from transparent electrical conductive material such as ITO or IZO, are formed in the transverse direction (the x-axis direction) at predetermined intervals on the organic insulating film 12 of the array protrusions 11 (see FIGS. 2 and 6).

Additionally, a third metal wiring 20 is formed in the transverse direction on both the gate line 16 and the common electrode 13 (see FIG. 6).

A second insulating film 13B is formed on the common electrode 13, the third metal wiring 20, and the like (see FIGS. 3 to 7).

Figure 4:
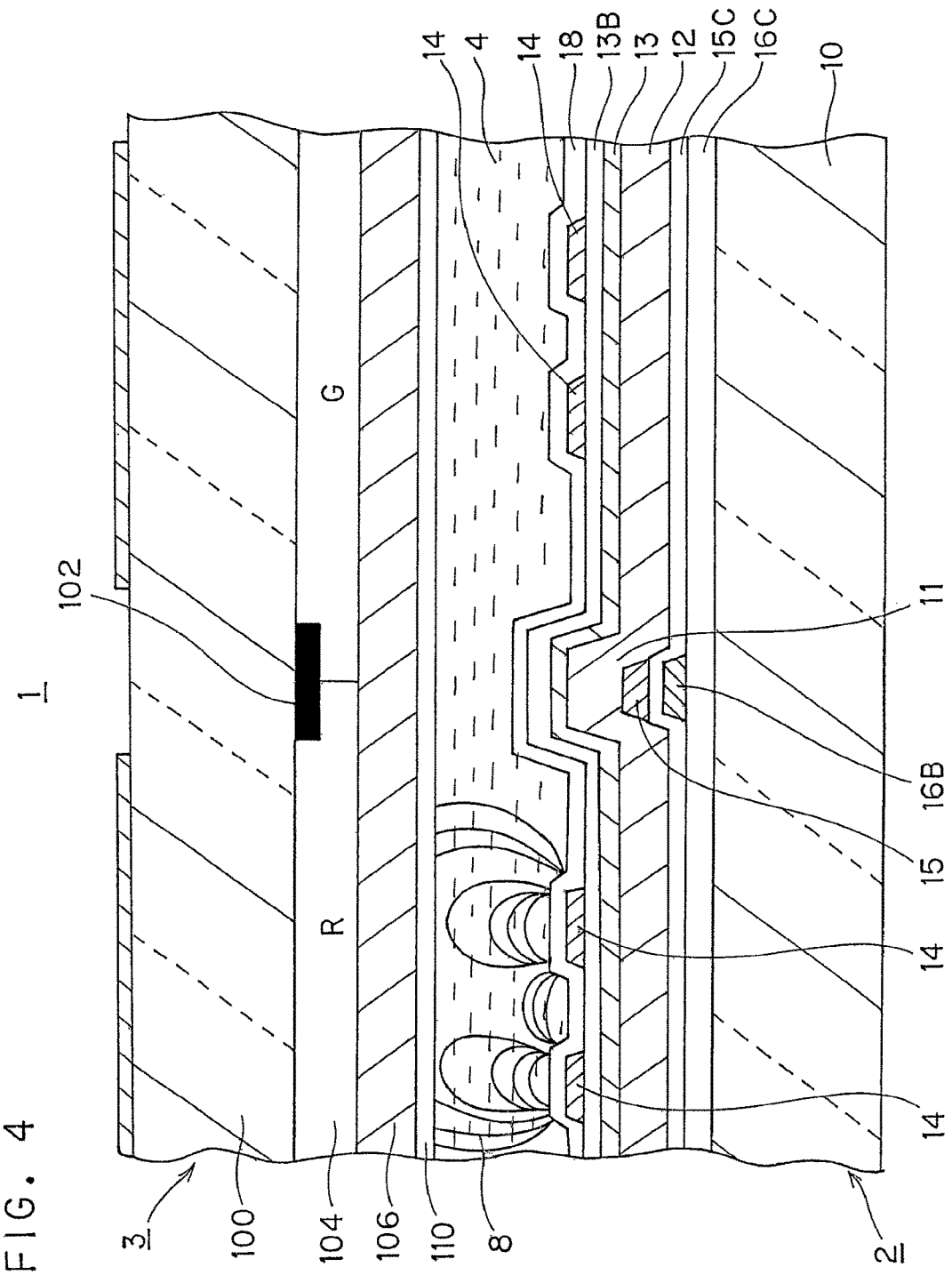
FIG. 4 is a cross-sectional view taken along line A-A of FIG. 3.

The pixel electrode 14 is disposed on the second insulating film 13B (see FIGS. 4 and 6).

An alignment film 18 is formed on the second insulating film 13B and the pixel electrode 14 (see FIGS. 3 to 7). The alignment film 18 is in contact with the liquid crystal layer 4. The alignment film 18 may be a horizontal alignment film oriented via a rubbing process or a photoalignment process, or may be a vertical alignment film.

Next, a more detailed description of the array protrusion 11 is given. The height of the organic insulating film 12 of the array protrusion 11 is greater than the height of the organic insulating film 12 within the pixel opening portion 31, and the organic insulating film 12 extends along the direction of the signal line 15. As illustrated in FIGS. 5 and 6, the array protrusion 11 includes the polysilicon interconnect 17 formed on the glass substrate 10, the gate insulating film 16C formed on the polysilicon interconnect 17, the first metal wiring 16B formed on the gate insulating film 16C, the first insulating film 15C formed on the first metal wiring 16B, the signal line 15 formed on the first insulating film 15C, the organic insulating film 12 formed on the signal line 15, the common electrode 13 formed on the organic insulating film 12, the third metal wiring 20 formed on the common electrode 13, the second insulating film 13B formed on the third metal wiring 20, and the alignment film 18 formed on the second insulating film 13B. The height of the array protrusion 11 is greater than the height of the organic insulating film 12 of the other portions. The first insulating film 15C and the second insulating film 13B may, for example, be formed from inorganic material.

Additionally, as illustrated in FIG. 7, a gate lead line is formed in the transverse direction, continuous with the gate line 16. The gate lead line is formed in the peripheral region of the array substrate 2 at the end portion of each transverse direction gate line 16.

(6) Counter Substrate 3

The counter substrate 3 will be described hereinafter with reference to FIGS. 3 to 4.

A black matrix 102 is formed beneath a glass substrate 100 of the counter substrate 3. The black matrix 102 is provided in a grid pattern using a black resin material. The black matrix 102 includes a vertical portion extending along the signal line 15 so as to cover the signal line 15 and the vicinity of the signal line 15, and a transverse portion extending continuously along each TFT 7 and gate line 16. Thus, the black matrix 102 is formed in a grid pattern. Each opening portion in the grid pattern of the black matrix 102 corresponds to the pixel opening portion 31.

As illustrated in FIG. 4, a color filter layer 104 made from red (R), green (G), and blue (B) is formed under the black matrix 102.

An overcoat layer 106 made from resin is formed under the color filter layer 104.

A counter protrusion 108 is formed under the overcoat layer 106. The counter protrusion 108 has a rectangular shape with rounded corners along the gate line 16 and is formed from the signal line 15 to the TFT 7.

An alignment film 110 is formed under the overcoat layer 106 and under the counter protrusion 108. The alignment film 110 is in contact with the liquid crystal layer 4.

The sensor electrodes (second sensor electrode) 112 extend along the vertical direction and are formed at predetermined intervals in the transverse direction (see FIG. 2) on the glass substrate 100 of the counter substrate 3.

(7) Spacer

As illustrated in FIGS. 3 to 5 and FIG. 7, the peak of the array protrusion 11 and the peak of the counter protrusion 108 contact each other and act as a spacer (photospacer). Specifically, the array protrusion 11 extending along the vertical direction signal line 15 and the counter protrusion 108 extending along the transverse direction gate line 16 combine in a cross shape to form a single spacer.

The spacer formed in this manner can be provided at a ratio of one to a plurality of the pixels 6. For example, the spacer can be provided at a ratio of one per four of the pixels 6 or at a ratio of one per eight of the pixels 6.

As illustrated in FIGS. 5 and 7, the thickness of the liquid crystal layer 4 is maintained by the columnar spacer formed by the array protrusion 11 and the counter protrusion 108.

(8) Driver 52 and Signal Selection Circuit 53

Figure 8:
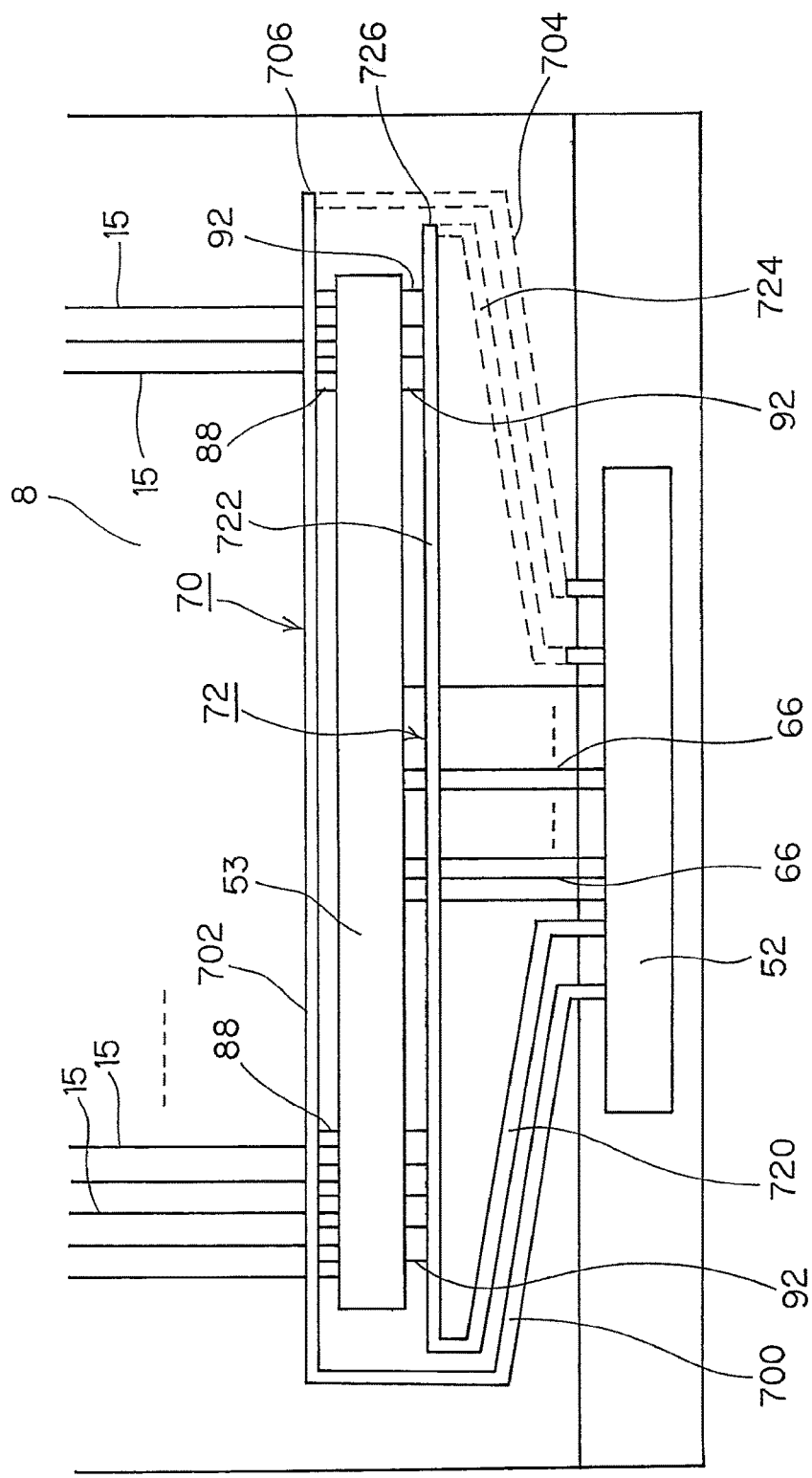
FIG. 8 is a plan view of a lower periphery of an array substrate.

The driver 52 and the signal selection circuit 53 will be described hereinafter with reference to FIGS. 1 and 8. As illustrated in FIGS. 1 and 8, the driver 52 and the signal selection circuit 53 are disposed along the x-axis direction in the lower peripheral region 9. The driver 52 outputs RGB image signals to the signal selection circuit 53. The signal selection circuit 53 divides the RGB image signals output from the driver 52 into R image signals, G image signals, and B image signals, inverts the polarity of the image signals, and outputs the image signals to signal lines 15R, 15G, and 15B. The pixels 6 formed for R, G, and B colors are connected to the signal lines 15R, 15G, and 15B, respectively.

As illustrated in FIG. 8, image signal lines 66 are wired from the driver 52 to the signal selection circuit 53. The RGB image signals are output via the image signal lines 66. Additionally, a first open-close signal line 70 and a second open-close signal line 72 are wired from the driver 52 to the signal selection circuit 53. The first open-close signal line 70 and the second open-close signal line 72 control the signal selection circuit 53.

As illustrated in FIG. 8, after the first open-close signal line 70 is drawn from the left side of the driver 52, the first open-close signal line 70 is wired along the top side of the signal selection circuit 53, and is connected to the right side of the driver 52. In other words, the first open-close signal line 70 is configured in a form of a loop by a left lead line portion 700 including an inclined portion on the left side, a straight line portion 702 along the signal selection circuit 53, and a right lead line portion 704 including an inclined portion on the right side. Moreover, the right end of the straight line portion 702 is disconnected from the right lead line portion 704, and the right end of the straight line portion 702 is a free end 706. As such, power is supplied from the driver 52 to the first open-close signal line 70 only via one end. The separated right lead line portion 704 is referred to hereinafter as a first dummy line 704.

As illustrated in FIG. 8, after the second open-close signal line 72 is drawn from the left side of the driver 52, the second open-close signal line 72 is wired along the bottom side of the signal selection circuit 53, and is connected to the right side of the driver 52. In other words, the second open-close signal line 72 is configured in a form of a loop by a left lead line portion 720 including an inclined portion on the left side, a straight line portion 722 along the signal selection circuit 53, and a right lead line portion 724 including an inclined portion on the right side. Moreover, the right end of the straight line portion 722 is disconnected from the right lead line portion 724, and the right end of the straight line portion 722 is a free end 726. As such, power is supplied from the driver 52 to the second open-close signal line 72 only via one end. The separated right lead line portion 724 is referred to hereinafter as a second dummy line 724.

(9) Circuitry Configuration of Signal Selection Circuit 53

The circuitry configuration of the signal selection circuit 53 will be described hereinafter with reference to FIGS. 9A, 9B, and 9C.

Figure 9A:
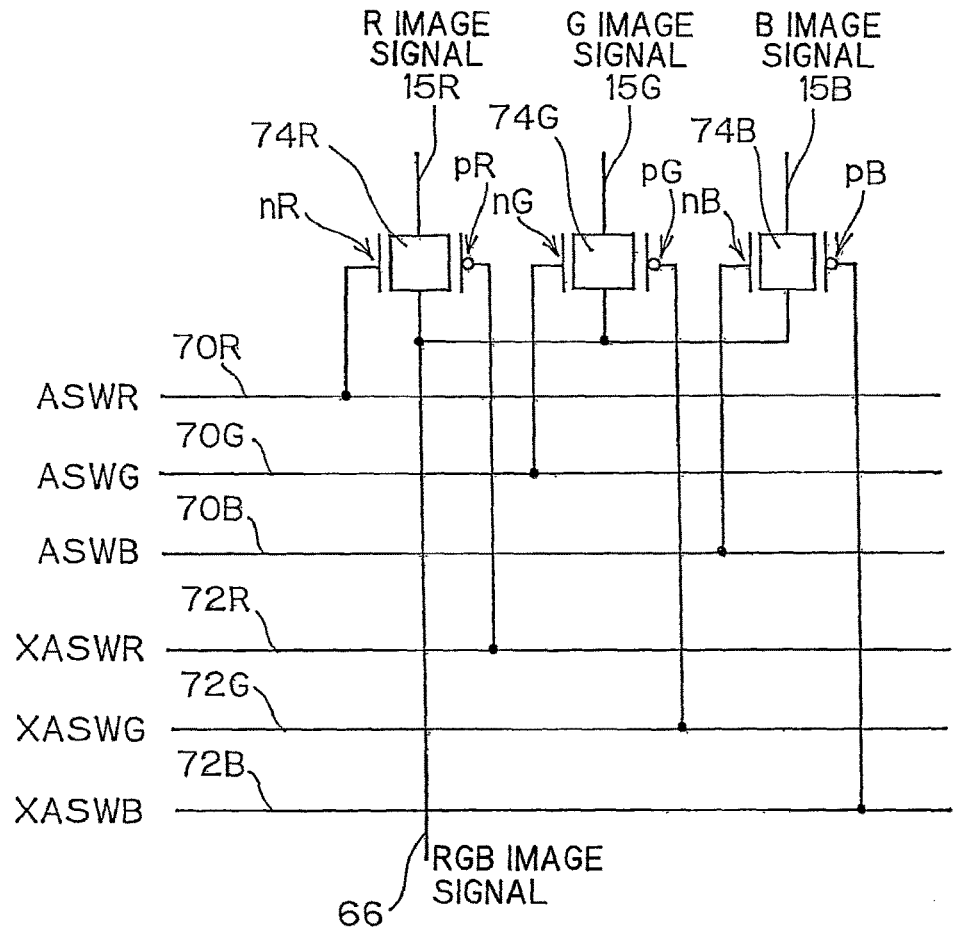
FIG. 9A is a circuit diagram of a signal selection circuit.
Figure 9B:
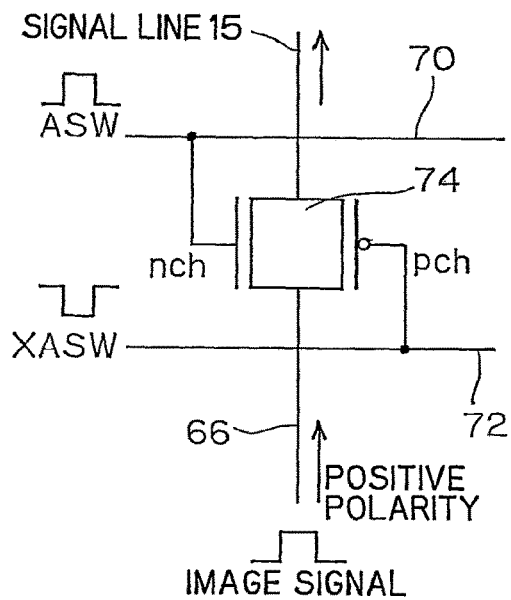
FIG. 9B is a circuit diagram of a case where an image signal of a positive polarity is written to a p-type switch.
Figure 9C:
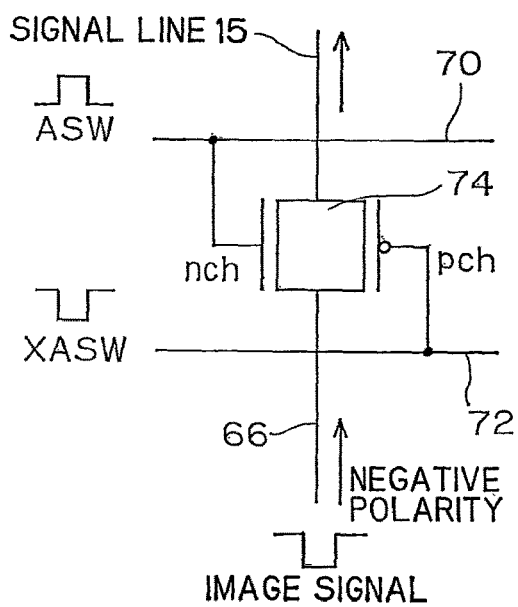
FIG. 9C is a circuit diagram of a case where an image signal of a negative polarity is written to an n-type switch.

As illustrated in FIG. 9A, the first open-close signal line 70 includes three lines, namely a first open-close signal line 70R for red (R), a first open-close signal line 70G for green (G), and a first open-close signal line 70B for blue (B). A first open-close signal ASW_RGB of the positive polarity for nch is output from the driver 52. Note that the first open-close signal line 70R for R, the first open-close signal line 70G for G, and the first open-close signal line 70B for B are sometimes referred to collectively as the first open-close signal line 70.

As illustrated in FIG. 9A, the second open-close signal line 72 includes three lines, namely a second open-close signal line 72R for red (R), a second open-close signal line 72G for green (G), and a second open-close signal line 72B for blue (B). A second open-close signal XASW_RGB of the negative polarity for pch is output from the driver 52. Note that the second open-close signal line 72R for R, the second open-close signal line 72G for G, and the second open-close signal line 72B for B are sometimes referred to collectively as the second open-close signal line 72.

An analog switch 74 is provided as a set including an analog switch 74R for red (R), an analog switch 74G for green (G), and an analog switch 74B for blue (B). A plurality of the sets of analog switches 74R, 74G, and 74B is provided.

The analog switch 74 is a combination of an n-type switch 76 and a p-type switch 78 that are made from CMOS. The n-type switch 76 and the p-type switch 78 open and close simultaneously on the basis of the first open-close signal ASW of the positive polarity and the second open-close signal XASW of the negative polarity. Moreover, as illustrated in FIG. 9B, when the image signal from the driver 52 has the positive polarity, the p-type switch 78 is mainly written, and the image signal is output to the signal line 15. On the other hand, as illustrated in FIG. 9C, when the image signal from the driver 52 has the negative polarity, the n-type switch 76 is mainly written, and the image signal is output to the signal line 15. The analog switch 74R operates when an R image signal is output to the signal line 15R, the analog switch 74G operates when a G image signal is output to the signal line 15G, and the analog switch 74B operates when a B image signal is output to the signal line 15B.

The image signal line 66 is connected to an input terminal of the analog switch 74R, and the signal line 15R, to which the pixel 6 of R is connected, is connected to an output terminal of the analog switch 74R. The first open-close signal line 70R is connected to a first control terminal nR of an n-type switch 76R, and the first open-close signal ASWR of the positive polarity is input. The second open-close signal line 72R is connected to a second control terminal pR of a p-type switch 78R, and the second open-close signal XASWR of the negative polarity is input.

The image signal line 66 is connected to an input terminal of the analog switch 74G, and the signal line 15G, to which the pixel 6 of G is connected, is connected to an output terminal of the analog switch 74G. The first open-close signal line 70G is connected to a first control terminal nG of an n-type switch 76G, and the first open-close signal ASWG of the positive polarity is input. The second open-close signal line 72G is connected to a second control terminal pG of a p-type switch 78G, and the second open-close signal XASWG of the negative polarity is input.

The image signal line 66 is connected to an input terminal of the analog switch 74B, and the signal line 15B, to which the pixel 6 of B is connected, is connected to an output terminal of the analog switch 74B. The first open-close signal line 70B is connected to a first control terminal nB of an n-type switch 76B, and the first open-close signal ASWB of the positive polarity is input. The second open-close signal line 72B is connected to a second control terminal pB of a p-type switch 78B, and the second open-close signal XASWB of the negative polarity is input.

(10) Wiring Structure of Signal Selection Circuit 53

Figure 10:
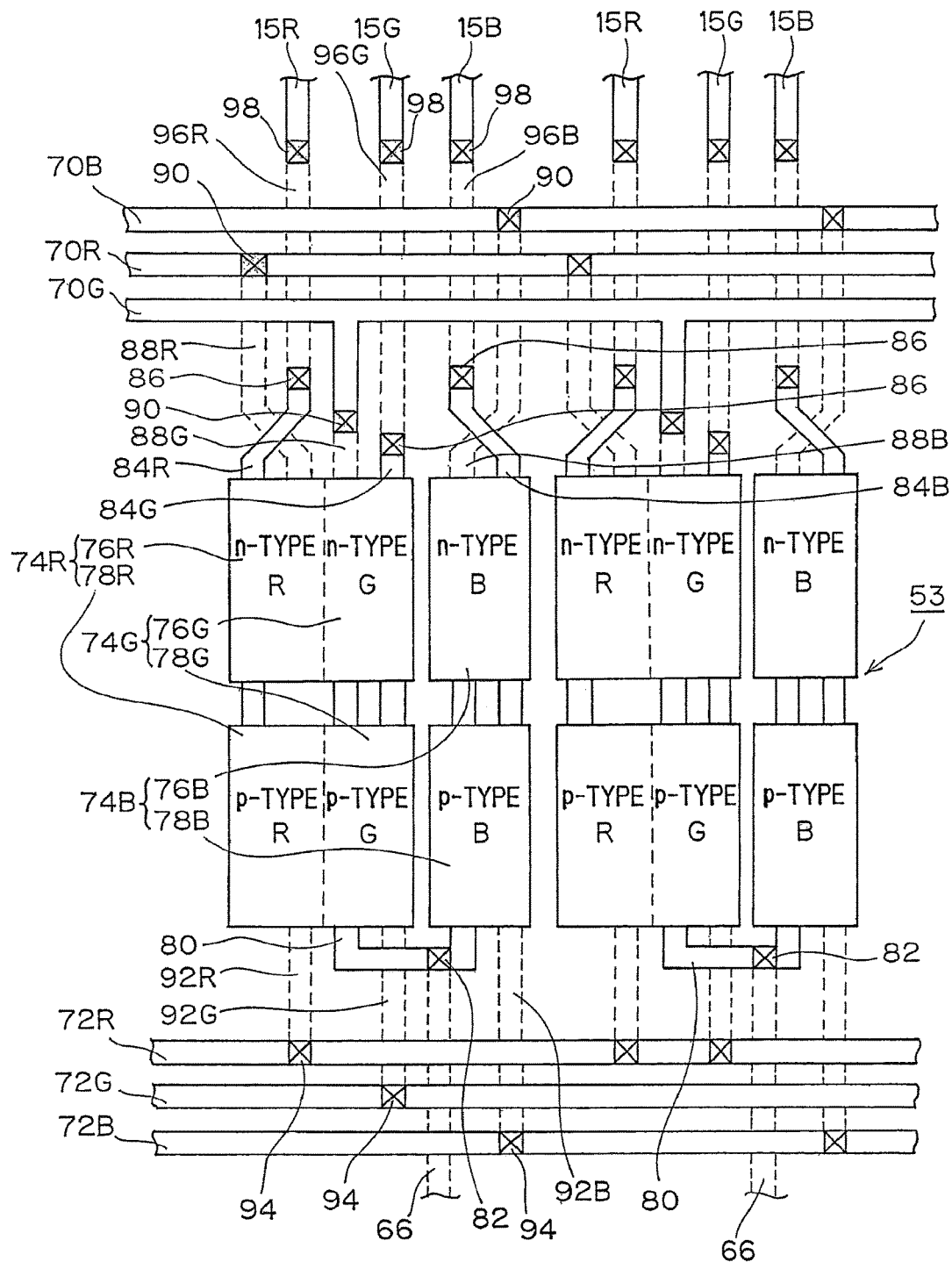
FIG. 10 is a plan view illustrating the wiring structure of the signal selection circuit.

FIG. 10 is a plan view illustrating the wiring structure of the signal selection circuit 53. In FIG. 10, the wiring drawn with solid lines represents wiring using the second metal wiring that forms the signal lines 15 in the display region 8; and the wiring drawn with dashed lines represents wiring using the first metal wiring that forms the gate lines 16 in the display region 8. Electrical connections are formed between the upper and lower wires via contact holes 82, 86, 90, and 94.

The first open-close signal lines 70R, 70G, and 70B are wired along the x-axis direction using the second metal wiring. The second open-close signal lines 72R, 72G, and 72B are wired along the x-axis direction using the second metal wiring.

The plurality of sets of analog switches 74 is formed between the first open-close signal line 70 and the second open-close signal line 72.

First control lines 88R, 88G, and 88B connected to the first control terminals of the n-type switches 76R, 76G, and 76B of the analog switches 74R, 74G, and 74B are formed using the first metal wiring, and are electrically connected to the first open-close signal lines 70R, 70G, and 70B via the contact holes 90.

Second control lines 92R, 92G, and 92B connected to the second control terminals of the p-type switches 78R, 78G, and 78B of the analog switches 74R, 74G, and 74B are formed using the first metal wiring, and are electrically connected to the second open-close signal lines 72R, 72G, and 72B via the contact holes 94.

An input line 80 connecting an input terminal of the n-type switch 76 of the analog switch 74 to an input terminal of the p-type switch 78 of the analog switch 74 is formed using the second metal wiring; the image signal line 66 is formed using the first metal wiring; and the input line 80 and the image signal line 66 are connected to each other via the contact hole 82.

An output line 84 connecting an output terminal of the n-type switch 76 of the analog switch 74 to an output terminal of the p-type switch 78 of the analog switch 74 is formed using the second metal wiring. The output line 84 is electrically connected to a connection line 96 formed using the first metal wiring via the contact hole 86. The connection line 96 is electrically connected to the signal line 15 formed using the second metal wiring via a contact hole 98.

(11) Manufacturing Method of Array Substrate 2

An overview of the manufacturing method of the array substrate 2 will be described hereinafter with reference to FIGS. 11 to 14.

Figure 11:
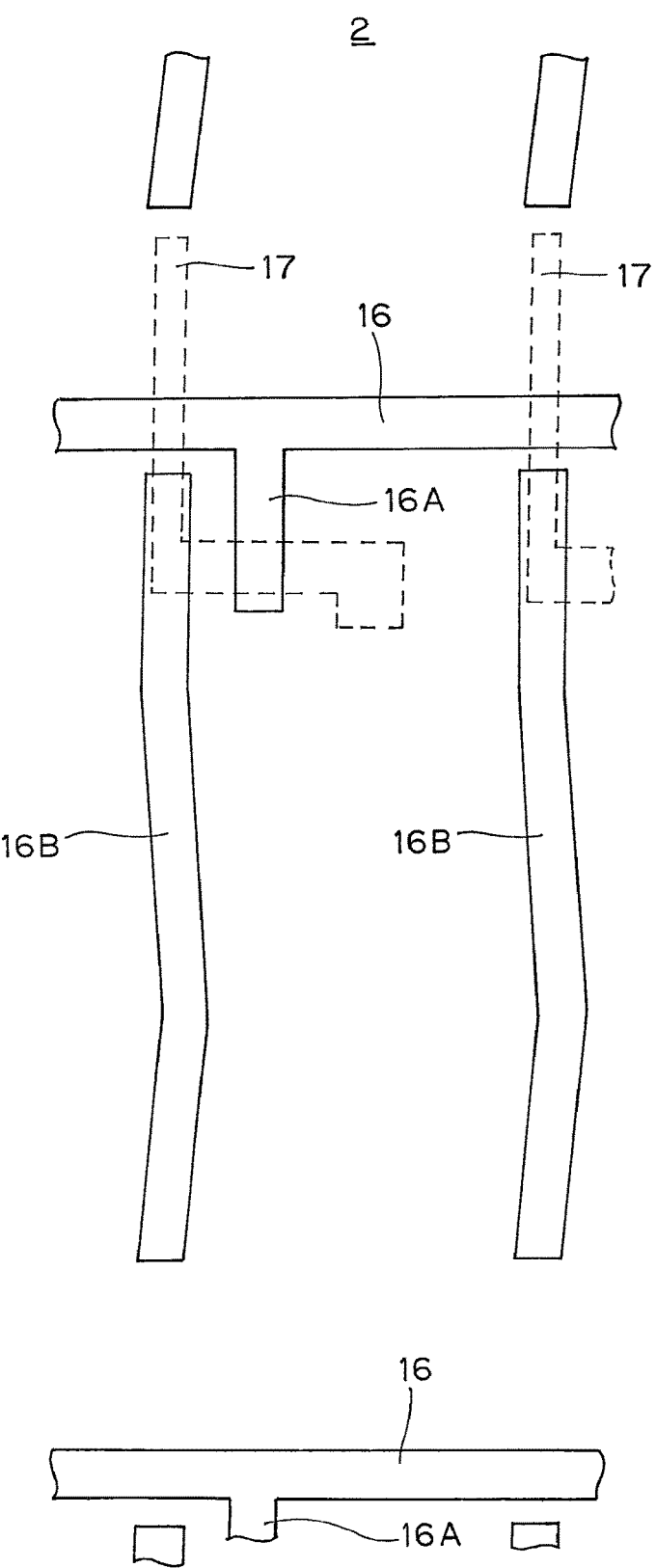
FIG. 11 is a drawing depicting a first process and a second process of a manufacturing method of the array substrate.

In a first process, as illustrated in FIG. 11, for each pixel 6, the polysilicon interconnect 17 is formed on the glass substrate 10 of the array substrate 2 in the vertical direction. Next, the polysilicon interconnects 17 and the entirety of the array substrate 2 are covered by the gate insulating film 16C made from a silicon oxide film, a silicon nitride film, or the like.

In a second process, as illustrated in FIG. 11, a metal layer such as a molybdenum alloy is used to form the gate line 16 in the transverse direction, the gate electrode branch line 16A extending in the vertical direction from the gate line 16, the first metal wiring 16B in the vertical direction that is orthogonal to and separated from the gate line 16, and the gate lead line 16D extending from the end of the gate line 16. Next, these lines and the entirety of the array substrate 2 are covered by the first insulating film 15C made from a silicon oxide film, a silicon nitride film, or the like. Additionally, the input line 80, the output line 84, the first control line 88, and the second control line 92 of the analog switch 74 are formed when forming the gate line 16.

Figure 12:
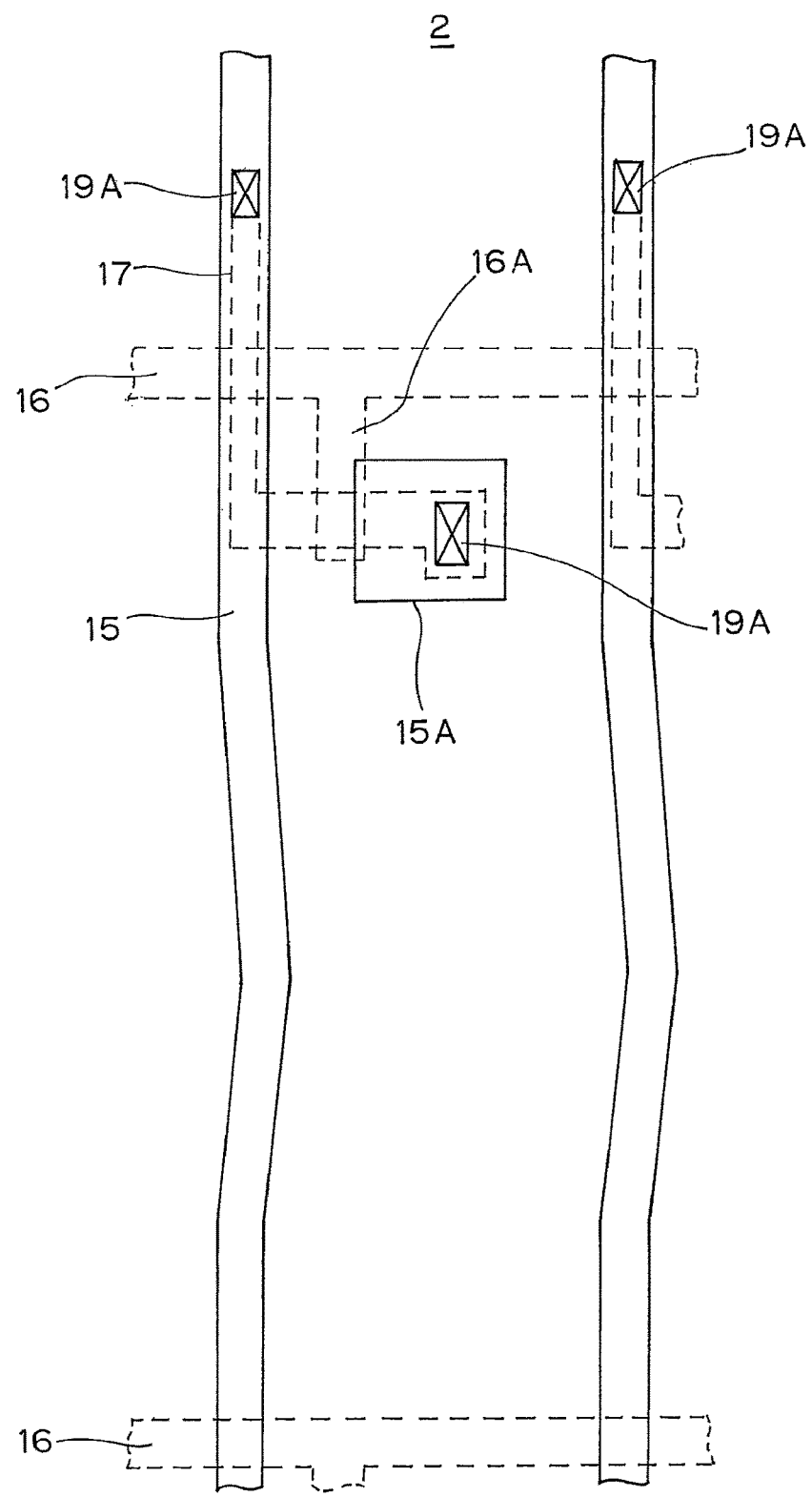
FIG. 12 is a drawing depicting a third process and a fourth process.

In a third process, as illustrated in FIG. 12, contact holes 19A, 19A penetrating through the first insulating film 15C and the gate insulating film 16C and exposing both ends of the polysilicon interconnects 17 are formed.

In a fourth process, as illustrated in FIG. 12, the second metal wiring, namely, the signal line 15 is formed in the vertical direction on the first insulating film 15C and on the first metal wiring 16B. The signal line 15 is formed using a metal such as aluminum or an alloy thereof (e.g. TAT (Ti/Al/Ti)). At this time, a first island pattern 15A is formed using the same material as the signal line 15 at the contact hole 19A on the TFT 7 side. The first open-close signal lines 70R, 70G, and 70B and the second open-close signal lines 72R, 72G, and 72B are formed when forming the signal line 15.

In a fifth process, the transparent organic insulating film 12 provided with the array protrusion 11 is formed. The signal line 15 and the first island pattern 15A are covered by the organic insulating film 12. Next, a contact hole 19B that exposes a portion of the first island pattern 15A is formed.

Figure 13:
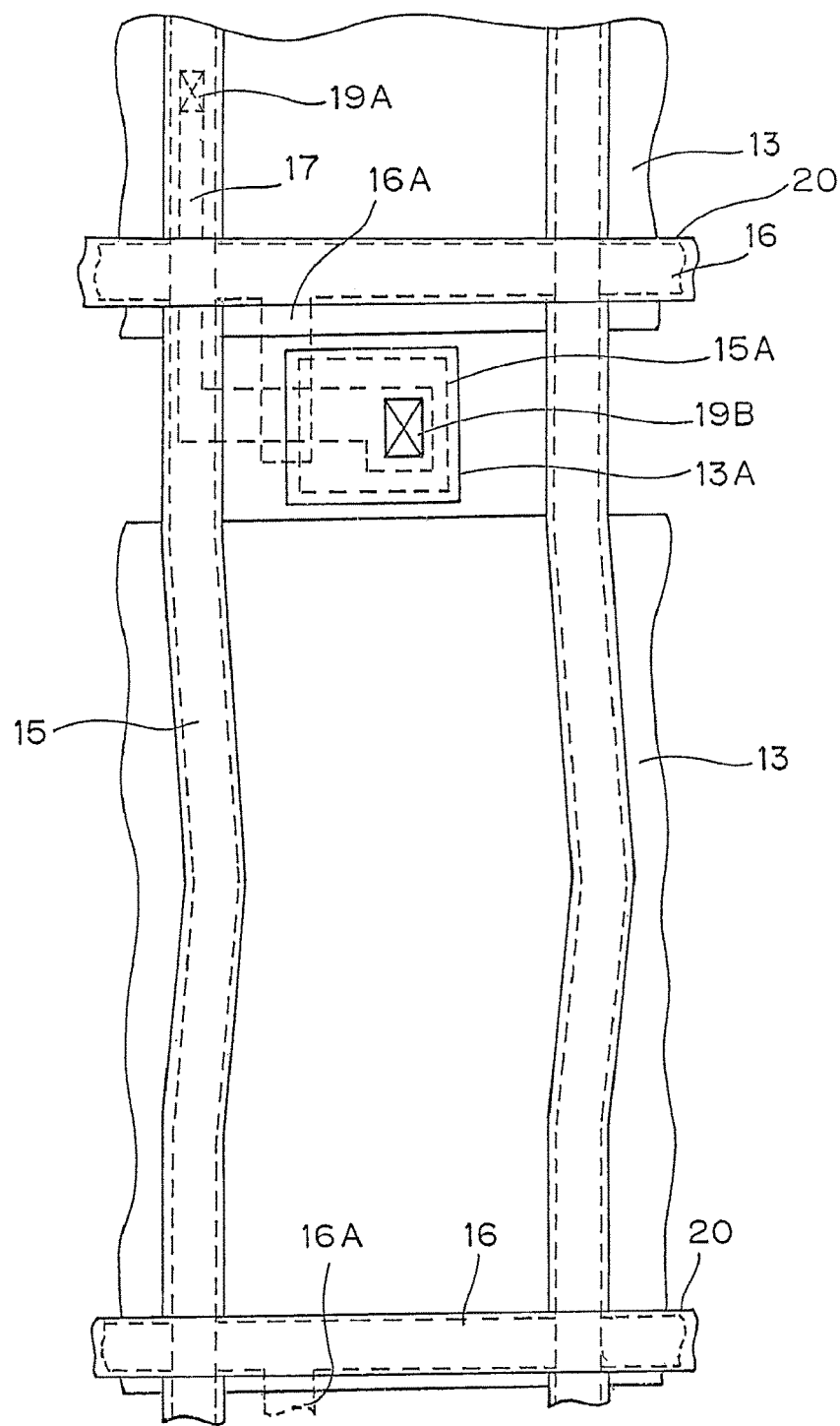
FIG. 13 is a drawing depicting a fifth process and a seventh process.

In a sixth process, as illustrated in FIG. 13, the common electrode 13, which is made from a transparent electrical conductive material such as ITO or IZO, is formed on the organic insulating film 12. At this time, a second island pattern 13A is formed using the same material as the common electrode 13 at the TFT 7 section. As illustrated in FIG. 2, the common electrode 13 is formed in the transverse direction so as to cover the pixels 6 that are side-by-side in the transverse direction.

In a seventh process, as illustrated in FIG. 13, the third metal wiring 20 is formed on the common electrode 13 and on the gate line 16. Examples of the material of the third metal wiring 20 include MAM (Mo/Al/Mo).

Figure 14:
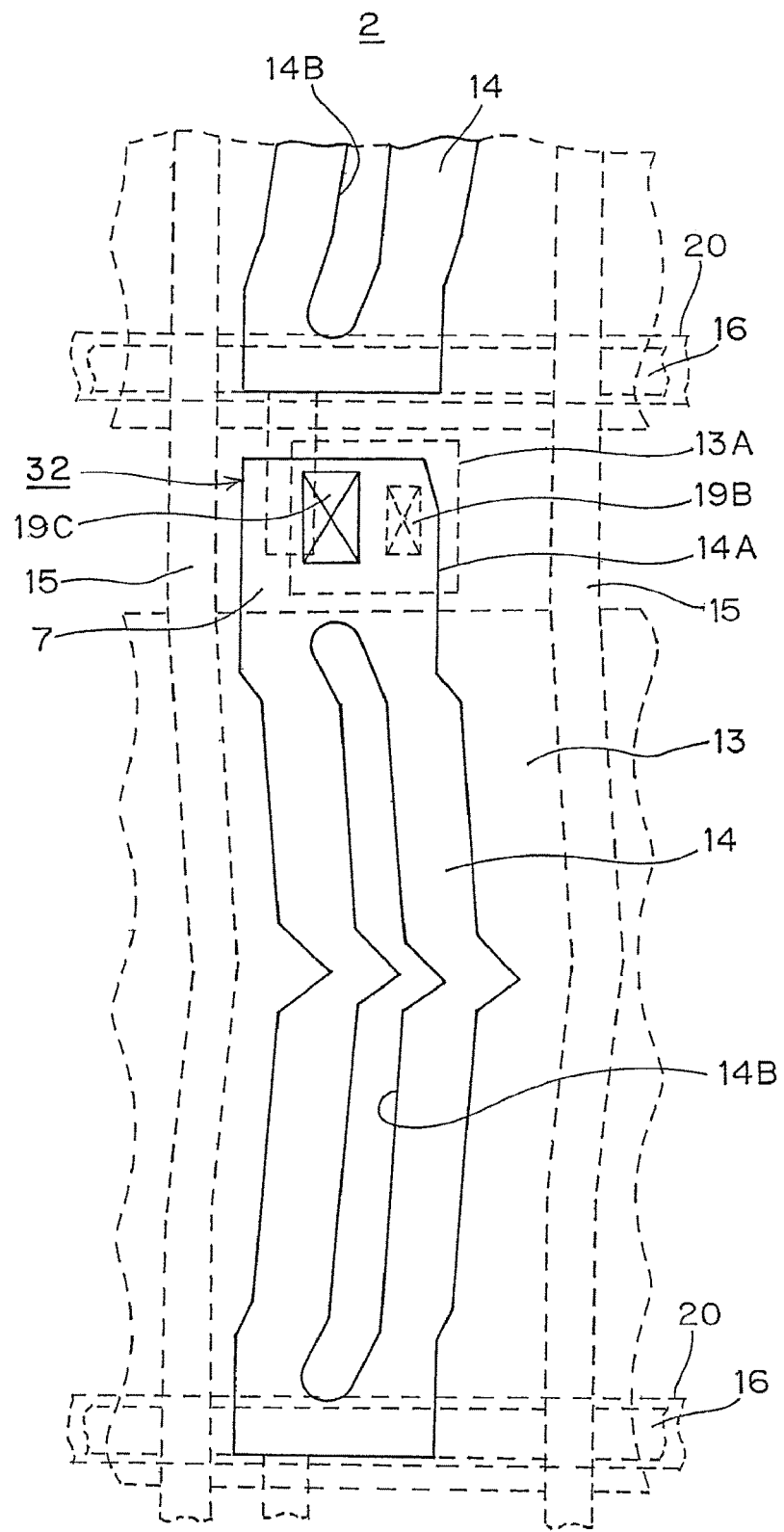
FIG. 14 is a drawing depicting an eighth process and a ninth process.

In an eighth process, as illustrated in FIG. 14, the second insulating film 13B that covers the common electrode 13, the third metal wiring 20, and the like is formed on the entirety of the array substrate 2. Next, a contact hole 19C that exposes a portion of the second island pattern 13A is formed.

In a ninth process, as illustrated in FIG. 14, the pixel electrode 14, which is made from a transparent electrical conductive material such as ITO or IZO, is formed. The slit 14B is formed in the pixel electrode 14 along the signal line 15.

In a tenth process, the alignment film 18 made from resin is formed on the entirety of the array substrate 2. Finally, the array substrate 2 is subjected to photo alignment treatment by UV irradiation.

(12) Effects

According to this embodiment, the second ends of the first open-close signal lines 70R, 70G, and 70B and the second ends of the second open-close signal lines 72R, 72G, and 72B are free. As such, the resistance of the wires increases, the through-rates of the high-frequency pulsed first open-close signal ASW and the second open-close signal XASW decrease, and the generation of noise is prevented. In addition, due to the fact that these open-close signal lines are supplied with power from only one side, which differs from looped configurations, the influence of noise can be reduced.

Moreover, after the display panel 1 has been completely assembled, even if tests reveal that the first open-close signal line 70 or the second open-close signal line 72 is not operating properly due to a disconnection, the signal selection circuit 53 can be made to operate properly by connecting the first dummy line 704 or the second dummy line 724.

(13) Modifications

In the first embodiment described above, an example was described in which the free ends 706 and 726 of the first open-close signal line 70 and the second open-close signal line 72 were provided on the right side of the array substrate 2. However, a configuration is possible in which the free ends 706 and 726 are on the left side of the straight line portions 702 and 722.

Second Embodiment

Figure 15:
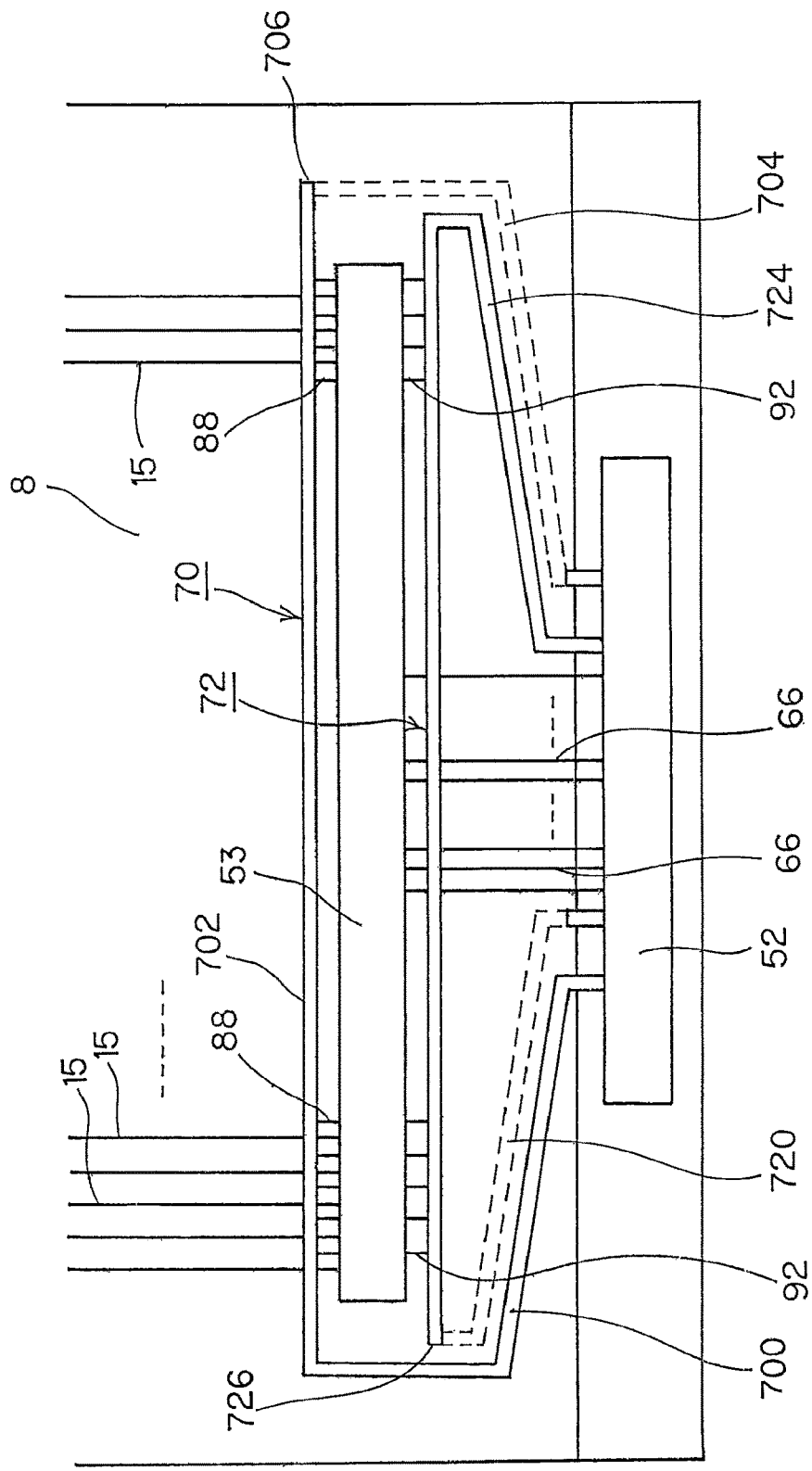
FIG. 15 is a plan view of a lower periphery of an array substrate according to a second embodiment.

A liquid crystal display device according to a second embodiment will be described hereinafter with reference to FIG. 15.

In the first embodiment described above, an example was described in which the free ends 706 and 726 of the first open-close signal line 70 and the second open-close signal line 72 were provided on the right side of the array substrate 2. However, in this embodiment, the right side end of the straight line portion 702 of the first open-close signal line 70 is free and the left side end of the second open-close signal line 72 is free.

As a result of this configuration, even if there is insufficient writing of the analog switch 74 at the terminations of the first open-close signal line 70 and the second open-close signal line 72, a write margin can be ensured for each other.

In the second embodiment described above, an example was described in which the free end of the first open-close signal line 70 was the right side and the free end of the second open-close signal line 72 was the left side. However, a configuration is possible in which the left side of the first open-close signal line 70 is the free end and the right side of the second open-close signal line 72 is the free end.

Third Embodiment

Figure 16:
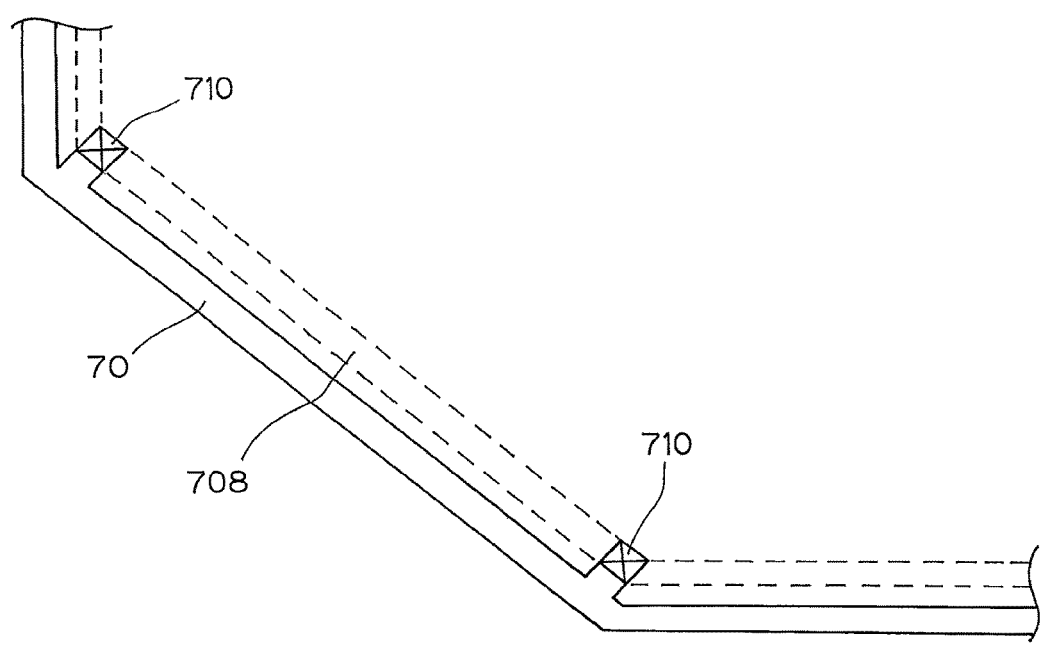
FIG. 16 is a plan view of a first open-close signal line according to a third embodiment.

A liquid crystal display device according to a third embodiment will be described hereinafter with reference to FIG. 16.

In the embodiments described above, the first open-close signal line 70 and the second open-close signal line 72 were formed using only the second metal wiring. However, in this embodiment, a first upper open-close signal line 70 is formed from the second metal wiring and, in a layer thereunder, a first lower open-close signal line 708 is formed using the first metal wiring. In this case, as illustrated in FIG. 16, the first upper open-close signal line 70 of the upper layer and the first lower open-close signal line 708 of the lower layer are provided at offset positions so as not to overlap, and the first upper open-close signal line 70 and the first lower open-close signal line 708 are connected to each other via a contact hole 710.

The second open-close signal line 72 is configured in a likewise manner. That is, a second upper open-close signal line is formed from the second metal wiring and, in a layer thereunder, a second lower open-close signal line is formed using the first metal wiring.

According to this embodiment, even if the first upper open-close signal line 70 of the upper layer or the first lower open-close signal line 708 of the lower layer disconnects, the signal selection circuit 53 will operate properly due to the overall state of electrical connection.

Fourth Embodiment

Figure 17:
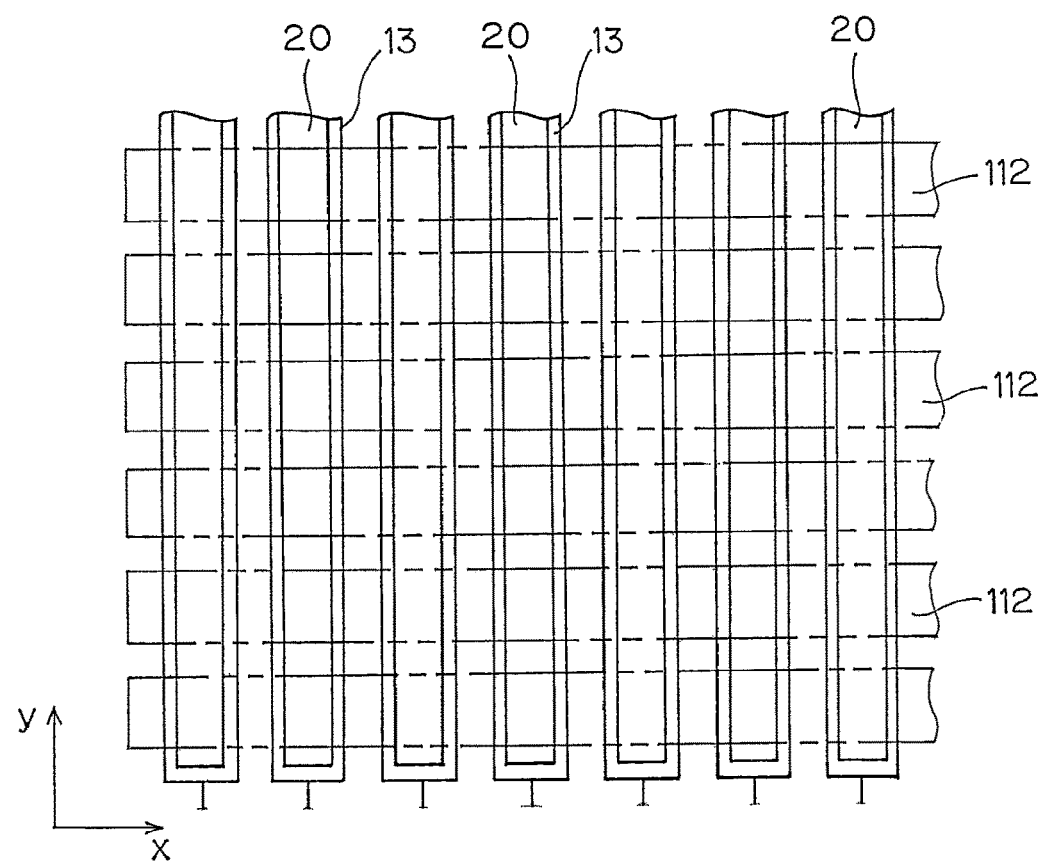
FIG. 17 is a plan view of common electrodes and sensor electrodes according to a fourth embodiment.

A liquid crystal display device according to a fourth embodiment will be described hereinafter with reference to FIG. 17.

In the first embodiment, the common electrodes 13 provided on the array substrate 2 were formed along the transverse direction (the x-axis direction) and the sensor electrodes 112 provided on the counter substrate 3 were formed along the vertical direction (the y-axis direction).

However, in this embodiment, the common electrodes 13 provided on the array substrate 2 are formed along the vertical direction (the y-axis direction) parallel to the signal lines 15, and the sensor electrodes 112 provided on the counter substrate 3 are formed along the x-axis direction parallel to the gate lines 16.

Modifications

In the embodiments described above, the pixels 6 using an RGB structure were used. However, a configuration is possible in which pixels 6 using an RGBW (W: white) structure are used. In this case, four pixels 6 are connected to one set of analog switches 74.

Provided that they encompass the spirit of the invention, all embodiments implementable by a person skilled in the art making design changes or modifications to the embodiments described above should be construed to be within the scope of the present invention.

Various modifications and alterations can be conceived by those skilled in the art within the spirit of the present invention, and it is understood that such modifications and alterations are also encompassed within the scope of the present invention. For example, those skilled in the art can suitably modify the above-described embodiment by addition, deletion, or design change of components, or by addition, omission, or condition change of steps. Such modifications are also encompassed within the scope of the present invention as long as they include the gist of the present invention.

Other advantageous effects that are provided by the embodiments and that are obvious from the present specification or appropriately conceivable by those skilled in the art are naturally provided by the present invention.

What is claimed is:

1. A display device, comprising:
a first insulating substrate;
a plurality of gate lines in a display region on the first insulating substrate;
a plurality of signal lines in the display region, the plurality of signal lines being orthogonal to the plurality of gate lines;
pixel including switching elements at respective positions where the plurality of gate lines and the plurality of signal lines intersect and pixel electrodes connected to the switching elements;
a driver configured to output an image signal;
a signal selection circuit configured to distribute the image signal output from the driver to the signal line connected to the pixel;
a first open-close signal line configured to supply a first open-close signal from the driver to the signal selection circuit; and
a second open-close signal line configured to supply a second open-close signal from the driver to the signal selection circuit, the second open-close signal having a pole different from the first open-close signal;
a first end of the first open-close signal line being connected to the driver and a second end of the first open-close signal line being free; and
a first end of the second open-close signal line being connected to the driver and a second end of the second open-close signal line being free.

2. The display device according to claim 1, wherein:
the free second end of the first open-close signal line and the free second end of the second open-close signal line are on a same side of the first insulating substrate.

3. The display device according to claim 1, wherein:
the free second end of the first open-close signal line and the free second end of the second open-close signal line are on different sides of the first insulating substrate.

4. The display device according to claim 1, wherein:
the free second end of the first open-close signal line and a second end of a first dummy line having a first end connected to the driver are formed across a disconnect portion.

5. The display device according to claim 4, wherein:
the free second end of the second open-close signal line and a second end of a second dummy line having a first end connected to the driver are formed across a disconnect portion.

6. The display device according to claim 1, wherein:
the first open-close signal line includes a first upper open-close signal line and a first lower open-close signal line sandwiching an insulating film; and
in a plan view, the first upper open-close signal line and the first lower open-close signal line do not overlap each other and only portions of the first upper open-close signal line and the first lower open-close signal line are electrically connected to each other.

7. The display device according to claim 6, wherein:
the second open-close signal line includes a second upper open-close signal line and a second lower open-close signal line sandwiching an insulating film; and
in a plan view, the second upper open-close signal line and the second lower open-close signal line do not overlap each other and only portions of the second upper open-close signal line and the second lower open-close signal line are electrically connected to each other.

8. The display device according to claim 1, wherein:
the display region on the first insulating substrate comprises
a first metal wiring formed on the first insulating substrate, the first metal wiring constituting the gate lines;
a first insulating film formed on the first metal wiring;
a second metal wiring formed on the first insulating film, the second metal wiring constituting the signal lines;
an organic insulating film formed on the second metal wiring;
a first transparent electrode formed on the organic insulating film;
a third metal wiring formed on the first transparent electrode;
a second insulating film formed on the third metal wiring; and
a second transparent electrode formed on the second insulating film, the second transparent electrode constituting the pixel electrode.

9. The display device according to claim 8, wherein:
the first open-close signal line and the second open-close signal line are formed by the second metal wiring.

10. A circuit board, comprising:
a driver configured to output an image signal;
a signal selection circuit comprising an analog switch including an n-type switch and a p-type switch;
a first metal wiring configured to supply a positive polarity signal from the driver to the n-type switch; and
a second metal wiring configured to supply a negative polarity signal from the driver to the p-type switch;
a first end of the first metal wiring being connected to the driver and a second end of the first metal wiring being free; and
a first end of the second metal wiring being connected to the driver and a second end of the second metal wiring being free.

11. The circuit board according to claim 10, wherein:
the free second end of the first metal wiring and the free second end of the second metal wiring are on a same side.

12. The circuit board according to claim 10, wherein:
the free second end of the first metal wiring and the free second end of the second metal wiring are on different sides.

13. The circuit board according to claim 10, wherein:
the free second end of the first metal wiring and a second end of a first dummy line having a first end connected to the driver are formed across a disconnect portion.

14. The circuit board according to claim 13, wherein:
the free second end of the second metal wiring and a second end of a second dummy line having a first end connected to the driver are formed across a disconnect portion.

15. The circuit board according to claim 10, wherein:
the first metal wiring includes a first upper metal wiring and a first lower metal wiring sandwiching an insulating film; and
in a plan view, the first upper metal wiring and the first lower metal wiring do not overlap each other and only portions of the first upper metal wiring and the first lower metal wiring are electrically connected to each other.

16. The circuit board according to claim 15, wherein:
the second metal wiring includes a second upper metal wiring and a second lower metal wiring sandwiching an insulating film; and
in a plan view, the second upper metal wiring and the second lower metal wiring do not overlap each other and only portions of the second upper metal wiring and the second lower metal wiring are electrically connected to each other.

* * * * *